(12) United States Patent
Moulin

(10) Patent No.: US 6,401,098 B1
(45) Date of Patent: Jun. 4, 2002

(54) SYSTEM FOR DATABASE CREATION, MAINTENANCE AND ACCESS USING EVENT MARKING AND TWO-DIMENSIONAL PARTITIONING

(75) Inventor: Alexander Moulin, Krefeld (DE)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/353,587

(22) Filed: Jul. 15, 1999

(51) Int. Cl.[7] ............................................... G06F 17/30
(52) U.S. Cl. ........................ 707/102; 707/200; 707/202; 705/34; 705/40; 709/202; 709/224
(58) Field of Search .................... 707/1–3, 9, 100–102, 707/500, 513, 200, 202; 705/1, 8, 9, 14, 26, 27, 2, 3, 4, 30, 34, 40; 713/200; 717/11; 709/202, 224; 711/112, 113

(56) References Cited

U.S. PATENT DOCUMENTS

| | | | |
|---|---|---|---|
| 5,822,780 A | | 10/1998 | Schutzman ................. 711/165 |
| 5,864,857 A | * | 1/1999 | Ohata et al. ................ 707/100 |
| 5,963,956 A | * | 10/1999 | Smartt ........................ 707/104 |
| 6,003,036 A | * | 12/1999 | Martin ........................ 707/102 |
| 6,014,656 A | * | 1/2000 | Hallmark et al. .............. 707/2 |
| 6,035,285 A | * | 3/2000 | Schlect et al. ................. 705/30 |
| 6,070,150 A | * | 5/2000 | Remington et al. ........... 705/34 |
| 6,092,055 A | * | 7/2000 | Owens et al. ................. 705/34 |
| 6,185,575 B1 | * | 2/2001 | Orcutt ........................ 707/200 |
| 6,289,322 B1 | * | 9/2001 | Kitchen et al. ............... 705/34 |
| 6,304,857 B1 | * | 10/2001 | Heindel et al. ............... 705/34 |

FOREIGN PATENT DOCUMENTS

WO    WO 99/28843    10/1999

OTHER PUBLICATIONS

International Search Report issued for corresponding International Application No. PCT/US99/16768 filed Jul. 26, 1999.

Rotem et al., "Physical Organization of Temporal Data", Proceedings of the International Conference on Data Engineering, US, Washington, IEEE Comp. Soc., vol. CONF 3, 1987, pp. 547–533, XP000757790.

* cited by examiner

Primary Examiner—Hosain T. Alam
Assistant Examiner—Shahid Alam

(57) ABSTRACT

A system and method that reduces access, backup, restore and processing time required by partitioning data in a database into two dimensions. The first dimension is by event processing date and the second dimension is by partition group. Once partitioned in two dimensions the data is stored in two-dimensional partitions in the form of rolling tables including an event marker. This partitioning and marking is done upon receipt of data which eliminates the need for further processing to efficiently store data. This partitioning and marking further reduces the size of data blocks that need to be handled when backing up or restoring data, deleting data, and retrieving data. Thus, extremely large volumes of data can be handled in an efficient manner.

44 Claims, 9 Drawing Sheets

SYSTEM FOR DATABASE CREATION, MAINTENANCE AND ACCESS USING EVENT MARKING AND TWO-DIMENSIONAL PARTITIONING

Reference To Microfiche Appendix

A microfiche appendix having 1 microfiche and 46 frames is included herewith containing the detailed design specification for the present invention.

BACKGROUND OF THE INVENTION

1. Field of the Invention

The present invention is directed to a system, method and data structure for database access, creation and maintenance through a two-dimensional database partitioning process. More particularly, the present invention is directed to a system which reduces access, backup, and processing time required by partitioning data in a database by partition group and then further partitioning each partition group by event processing date into two-dimensional partitions in the form of rolling tables.

2. Description of the Related Art

Many industries, but specifically telecommunications providers, need to maintain extremely large databases. Such databases contain customer records, price plans, as well as CDRs ("Call Detail Record"). CDRs are logged by network elements (i.e. telephone switches), where they are temporarily kept prior to being transferred to a database at the earliest opportunity. The rating and billing system uses the CDRs stored in the database for event rating, pricing and billing. The more customers and the higher the call volume, the larger the amount of data in the database. The larger the database partition, the slower the access to the data stored. Database access is typically the slowest part of the whole telecommunications computer system. Therefore, improvements in this area result in improvements of response time to the computer users.

No less important than response time are maintenance issues. The database size can reach a point where it is no longer feasible to do a backup in an off-peak period (e.g. at night), as this would take too long. Yet backups are key to data security and hence revenue. It should be noted that in order to preserve integrity and consistency, data shouldn't be modified during the backup process. Therefore, keeping backup time to a minimum is highly desirable.

Further, outside of the backup time required for modifications of large data volumes such modifications should also be avoided in a database for performance reasons. Data modifications is one of the most time consuming transactions compared to other database operations.

Database access time is of extreme importance to telecommunications firms, and other industries, due to the competitive nature of the industry. In the present highly competitive market, the telecommunication providers must offer new services such as real time rating and on demand bills. Both features require faster access to data stored in the database. This requirement conflicts directly with the above issues.

A large system in a mission critical environment needs to support several capabilities discussed below.

The ability to handle large volumes of data such as 30 million usage events per day minimum. Data needs to be stored online for up to 90 days in most applications.

As part of what has come to be called "Real Time Rating", events must be available in the system in a timely fashion for display so that the CSR would be able to access the latest events should a customer call.

It must be possible to back up the database in a reasonable period of time. The industry standard is nightly backups for new or modified data.

It must be possible for the database to be restored in a timely fashion in case of problems (e.g. disaster recovery, data corruption, database layout changes, etc.). For database layout changes backup and recovery must be able to fit into a single weekend, or other idle period to allow for normal production activities.

Further, fast deletion of old records such as those over 60–90 days old needs to be possible.

A high degree of flexibility is also required. As part of this flexibility it must be possible to change bill cycles and support billing "on demand". A variation of the latter is providing customer bills online so that at any point in the billing cycle the customer can check his balance to-date.

Prior to the present invention no system existed that could accomplish all the foregoing features for systems needing to process and retain extremely large volumes of data. Single dimension database partitioning is common and widely used in industry. However, no prior art is known similar to the two-dimensional partitioning through a combination of marking events and two-dimensional partitions in the form of rolling tables.

SUMMARY OF THE INVENTION

It is an object of the present invention provide a system and method that reduces access, backup, and processing time required by partitioning data in a database by partition group and then further partitioning the partition group by event processing date data into two-dimensional partitions in the form of rolling tables.

It is a further object of the present invention to handle large volumes of data and store this data online for a predetermined period of time so that the customers can query their charges and the CSR can access a customer's data quickly.

It is also an object of the present invention to support on demand billing, which when linked together with real time rating provides for a timely fashion to display data so that the CSR would be able to access the latest events should a customer call.

It is still a further object of the present invention to back up the database in a reasonable period of time, such as nightly backups, for new or modified data.

It is also an object of the present invention to restore the database in a timely fashion in case of problems (e.g. disaster recovery, data corruption, database layout changes, etc.). For database layout changes, backup and recovery must be able to fit into a single weekend, or other idle period to allow for normal production activities.

It is also an object of the present invention to quickly delete old records.

It is a further object of the present invention to afford a high degree of flexibility to enable to change bill cycles.

It is a still further object of the present invention to provide customer bills online so that at any point in the billing cycle the customer can check his balance to-date.

It is a further object of the present invention to minimize processing time required to access a database and thereby reduce the load on a server.

The above objects can be attained by a system, method and data structure that a system which reduces access, backup, and processing time required by partitioning data in a database by partition group and then further partition each partition group by event processing date into several two-dimensional partitions in the form of rolling tables.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
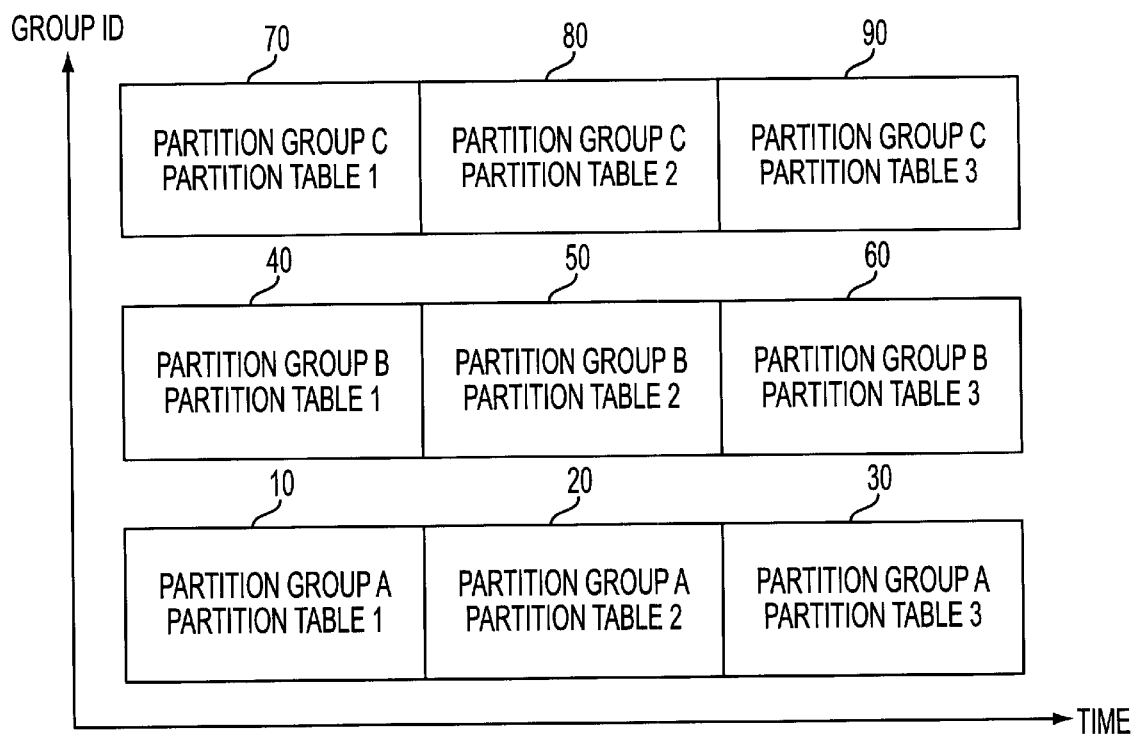
FIG. 1 is a chart representing data divided into partition groups and tables of equal size in the present invention.

The combination of Event marking and database partitioning is used to achieve the objectives discussed above. The first partitioning dimension is a generic field—Partition Group, which can be tailored for each installation of the system. An example of a population of the partitioning group is the current Bill Cycle Name (which could be represented by numbers, e.g. 01, 02 etc.). The second dimension is the Event Processing Date. As Partition Tables cannot be guaranteed on the bill cycle boundary, each event for a given customer is logged in the database with an Event Sequence Number. The combination of the Account ID (shown in FIGS. 1 through 3 Partition Groups) and the Event Sequence Number is the key for ERP to find the events in the events database. As a consequence of having the two-dimensional partitions, events are only inserted into a few partitions each day. As a consequence of inserting the Event Sequence number into the database at the same time as the events, the present invention only writes to the database tables once. The event sequence number is based on Account ID. Therefore, each account has its own event sequence number.

Using the concept of event marking combined with database partitioning briefly discussed above, large volumes of data can be partitioned into small tables such that fast access is achieved. As the Event insertion is by processing date, there is only one partition active for each Partition Group on a particular date. No modification of events is needed at billing time, since the events are marked before stored in the database. It allows for only the last partitions requiring to be backed up. Older partitions do not need to be backed up once done so, since events are not modified further after insertion. It is the combination of event marking together with the partitioning described here, which makes the concept of fast backup/restore workable.

Although the discussion of the present invention deals with examples specific to the telecommunication's industry, the concepts disclosed are applicable to any industry in need of storing large quantities of data in combination with the need for fast access and easy maintenance (backups, restores).

Before discussing in detail the features of the present invention a summary of the terms used in the discussion herein in the table 1.

TABLE 1

| TERM | DEFINITION |
| --- | --- |
| CDR | Call Detail Record |
| CSR | Customer Service Representative |
| Billing on demand | Production of a bill when customer requests it. |
| ERP | Event Rating and Pricing (computer subsystem) |
| CBM | Customer Billing Manager (computer subsystem) |
| CCM | Customer Care Manager (computer subsystem) |
| Controller | Software subsystem (part of CBM). Finds when a billing cycle is due to begin, initiates the production run and updates the cycle due date. |
| Event | Contains data related to usage (CDRs) and other customer related charges (e.g. one-time and recurring charges, adjustments). Also contains the Partition Group, Event Retention Period (indicates if the Event is to be deleted immediately after the production run is executed, deleted after the retention period, (e.g. 80 days), or never deleted. |

Keeping in mind the goal is to keep database partitions to a size that enables maintenance (nightly backups), and at the same time provides for fast and flexible access of the latest information. The access must be fast enough for a CSR to retrieve up-to-date records, which capture the calls customers had made up to the point of calling the CSR.

Segmenting partitions by bill cycle only would still create partitions that are too large, as typically a monthly bill cycle exists. For example, assuming the system processes 30 million CDRs per day and records need to be kept for 80 days, this would result in 2.4 billion usage events. With each usage event averaging approximately 1000 bytes, the database would be 2.4 Terabytes. Using daily partitions would still result in the daily partition size of 30 Gigabytes. Such large size partitions would detrimentally impact performance and make fast backups impossible. For example, the Oracle™ database recommends partitioning anything larger than 2 Gigabytes. Another reason for further partitioning is that the database needs to be independent of the bill cycles, i.e. a customer could decide to change his bill cycle from, for example, the $1^{st}$ of the month to the $15^{th}$ of each month. Further partitioning is thus needed. The second dimension for partitioning is by group ID.

The group ID has two requirements. First, the assignment of group IDs must be done in a configurable way in the production environment (e.g. initial bill cycle, random, constant, last digits of account ID etc.) Once assigned, the group ID of the account can be changed, but only on bill instance boundaries.

FIG. 1 illustrates the simple case where data is logged in the same period duration (e.g. a day or a week) for each group ID. In FIG. 1, group ID is represented by the vertical axis and time by the horizontal axis. Items 10, 20, and 30 belong to Group ID "A". Items 40, 50, and 60 belong to Group ID "B". Items 70, 80, and 90 belong to Group ID "C". If group ID numbers represent business customers, it is unlikely that all business customers will have the same level of activity. Larger corporations may generate more events in a day than small ones in a week. However, in FIG. 1, all partition tables are the same size.

Figure 2:
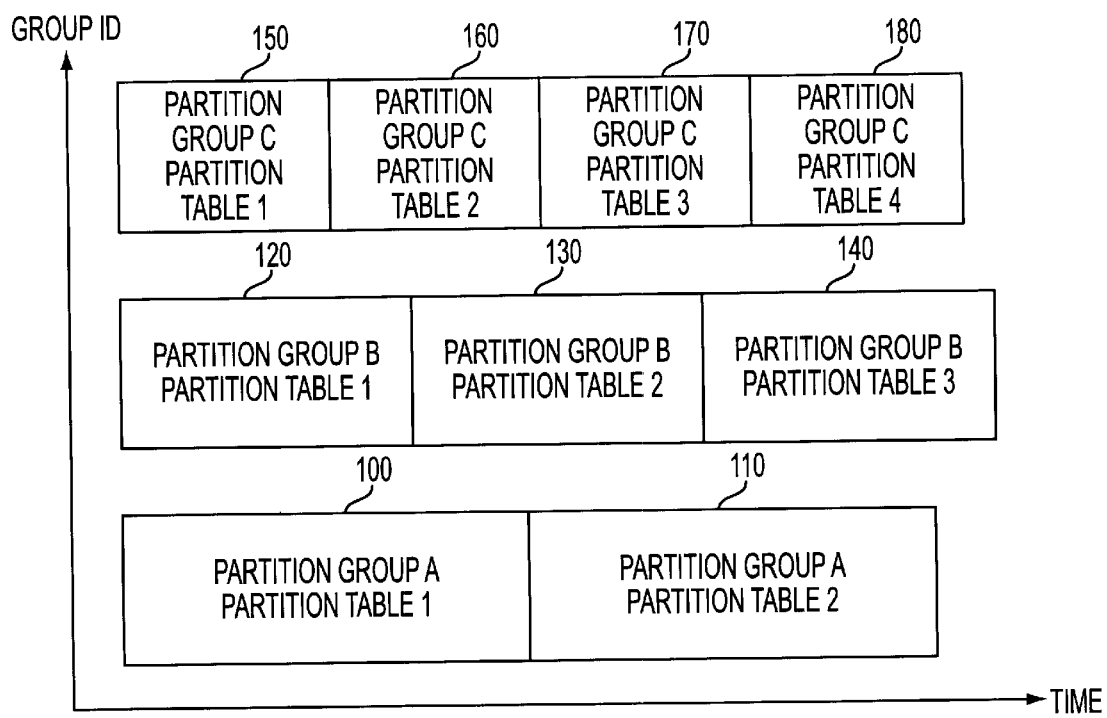
FIG. 2 is a chart representing data divided into partition groups and tables over varying time periods in the present invention.

Referring to FIG. 2, to keep the size of the partitions manageable, companies with higher numbers of events per day (Group C, items 150, 160, 170, and 180 in FIG. 2) would have shorter period of time per table than the small ones (Group A, 100 and 110 in FIG. 2).

Figure 3:
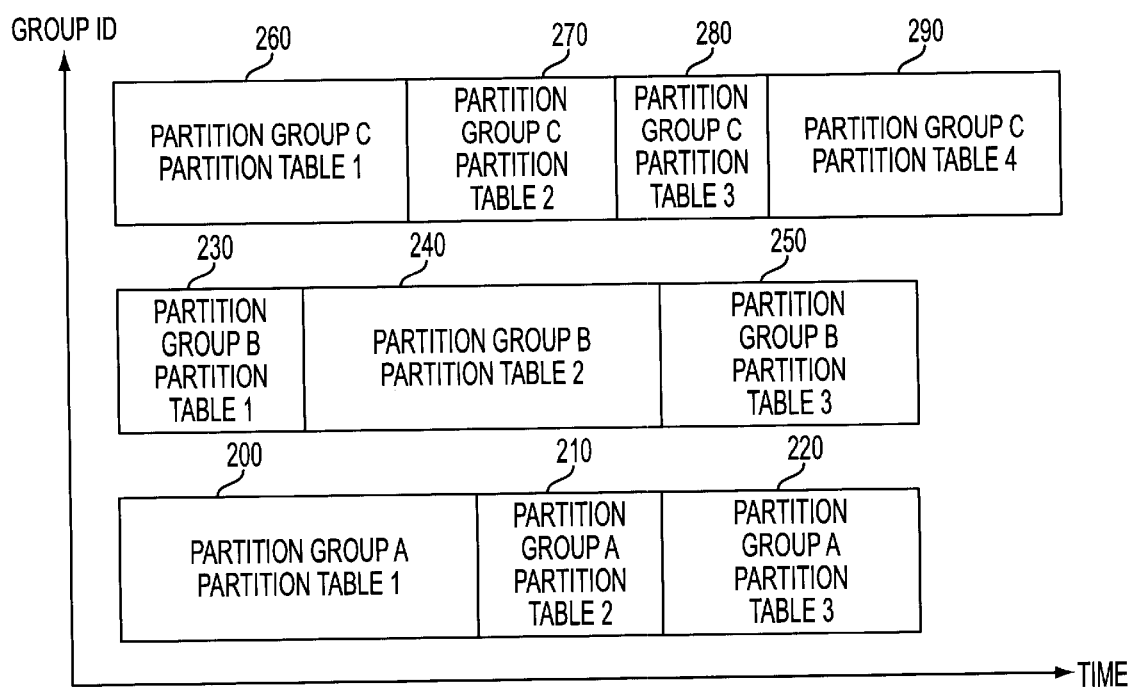
FIG. 3 is an example chart representing data divided into partition groups and tables as illustrated in FIG. 2.

Referring to FIG. 3, It is further possible to increase the flexibility within the same group by allowing different time periods for different groups as well as the same group. For example, for Group A, items 200, 210 and 220 in FIG. 3 would partition the week into three partitions of different sizes. First, item 200 would represent the time period Saturday through Tuesday since the volume of calls is very light over the weekend and moderately low on Monday and Tuesday. Second, item 210, represents a very heavy volume on Wednesday followed by, third, item 220 that contains a moderately heavy volume on Thursday and Friday.

By partitioning data as shown and discussed in FIG. 3, processing time required for backup and recovery can be kept low, because the table sizes are kept at a minimal size. For example, when the partitions are generated as per FIGS. 1–3, the "previous period" table (e.g. Item 200, Partition Group A, Partition Table 1) is backed up at night. The system still runs and safely uses "write" access, because the new events will be inserted into the "current day" table, rather than the "previous period" table being backed up. Once backed up, no further backup is necessary for an "old" partition.

The following examples shown in FIGS. 4 through 7 examines and illustrates concurrency and two-dimensional partitions in the form of rolling tables in more detail using a rating and billing process. The example contains six monthly bill cycles, each with a pricing delay of one day. Pricing delay is a delta between the bill run and the bill cycle due date. The decision whether to have a pricing delay is entirely up to the user. The present invention does not require the presence of a pricing delay. For each Partition Group, the database is assumed to contain 80 days worth of data.

The example has a different date for the bill cycle due date and pricing due date. Bill Cycle due date is the date the Controller will store the new bill periods (for April 1 through May 1) and set the bill cycle due date to the next month and create a new partition for it.

The Pricing Due date is the start of the Bill run. The Bill run actually produced the printed bill for the customer. The bill run could happen on the same day as the Bill Cycle due date or later than the Bill Cycle due date, or on customer demand. The earliest pricing due date is equal to the cycle due date, but the pricing due date could start later. However, in practice, telecommunications companies will normally want to minimize such differences and send bills out as soon as possible.

TABLE 2

| Bill Cycle Name (Partition Group) | Cycle Due Date | Billing Period Start and End Dates | Pricing Due Date (start of bill run) | Partition Table Number |
|---|---|---|---|---|
| 01 | February 01 | January 01–January 31 | February 2 | 1 |
|  | March 01 | February 01–February 28 | March 2 | 7 |
|  | April 01 | March 01–March 31 | April 2 | 13 |
|  | May 01 | April 01–April 30 | May 2 | 19 |
| 05 | February 05 | January 05–February 04 | February 6 | 2 |
|  | March 05 | February 05–March 04 | March 6 | 8 |
|  | April 05 | March 05–April 04 | April 6 | 14 |
| 10 | February 10 | January 10–February 9 | February 11 | 3 |
|  | March 10 | February 10–March 9 | March 11 | 9 |
|  | April 10 | March 10–April 9 | April 11 | 15 |
| 15 | February 15 | January 15–February 14 | February 16 | 4 |
|  | March 15 | February 15–March 14 | March 16 | 10 |
|  | April 15 | March 15–April 14 | April 16 | 16 |
| 20 | February 20 | January 20–February 19 | February 21 | 5 |
|  | March 20 | February 20–March 19 | March 21 | 11 |
|  | April 20 | March 20–April 19 | April 21 | 17 |
| 25 | February 25 | January 25–February 24 | February 26 | 6 |
|  | March 25 | February 25–March 24 | March 26 | 12 |
|  | April 25 | March 25–April 26 | April 26 | 18 |

Table 2 is used to illustrate the concept of concurrency. The example contains six monthly bill cycles, each with a pricing delay of one day.

Figure 4:
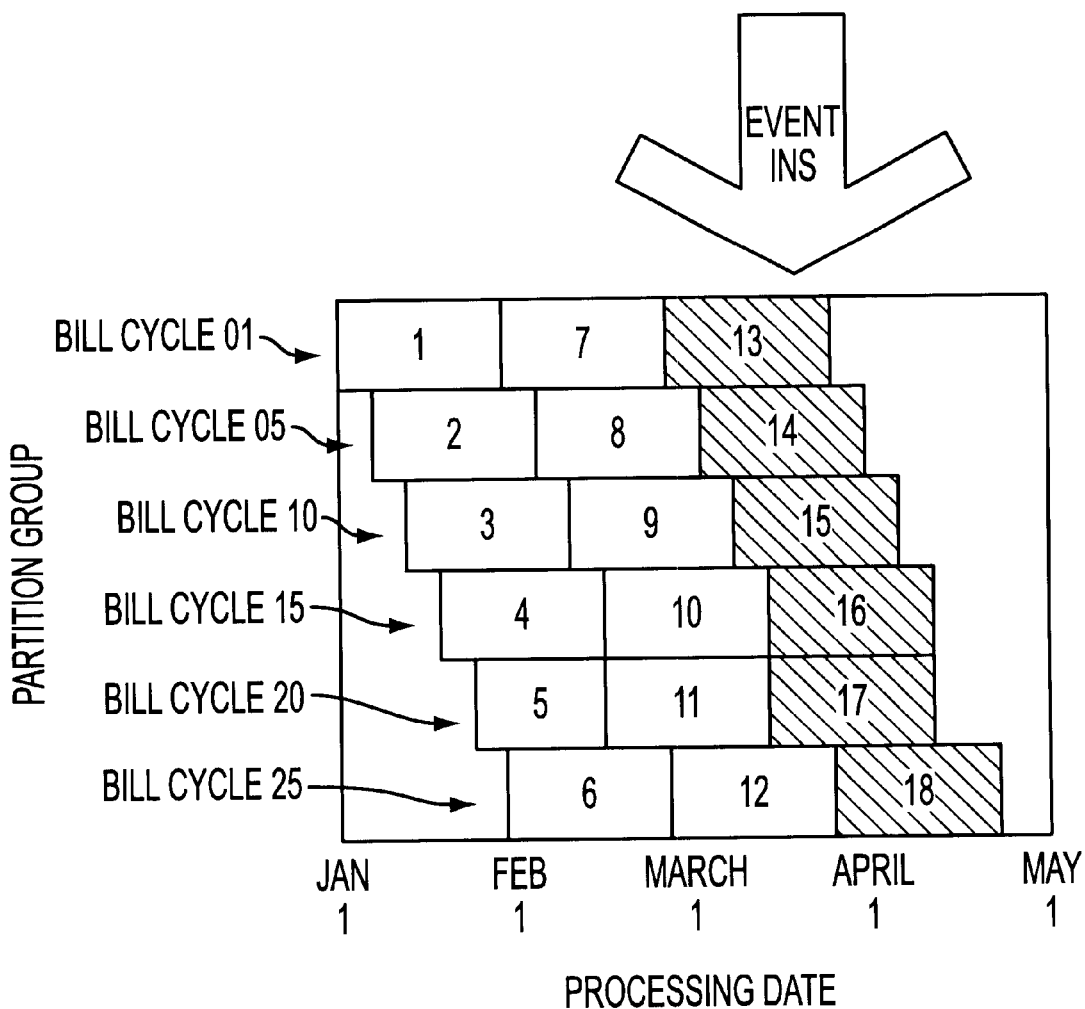
FIG. 4 is an example chart showing billing cycles and active partitions as of March 31 in the in the present invention.

For example, Bill Cycle 01 shown in FIG. 4, with a Cycle Due

Figure 5:
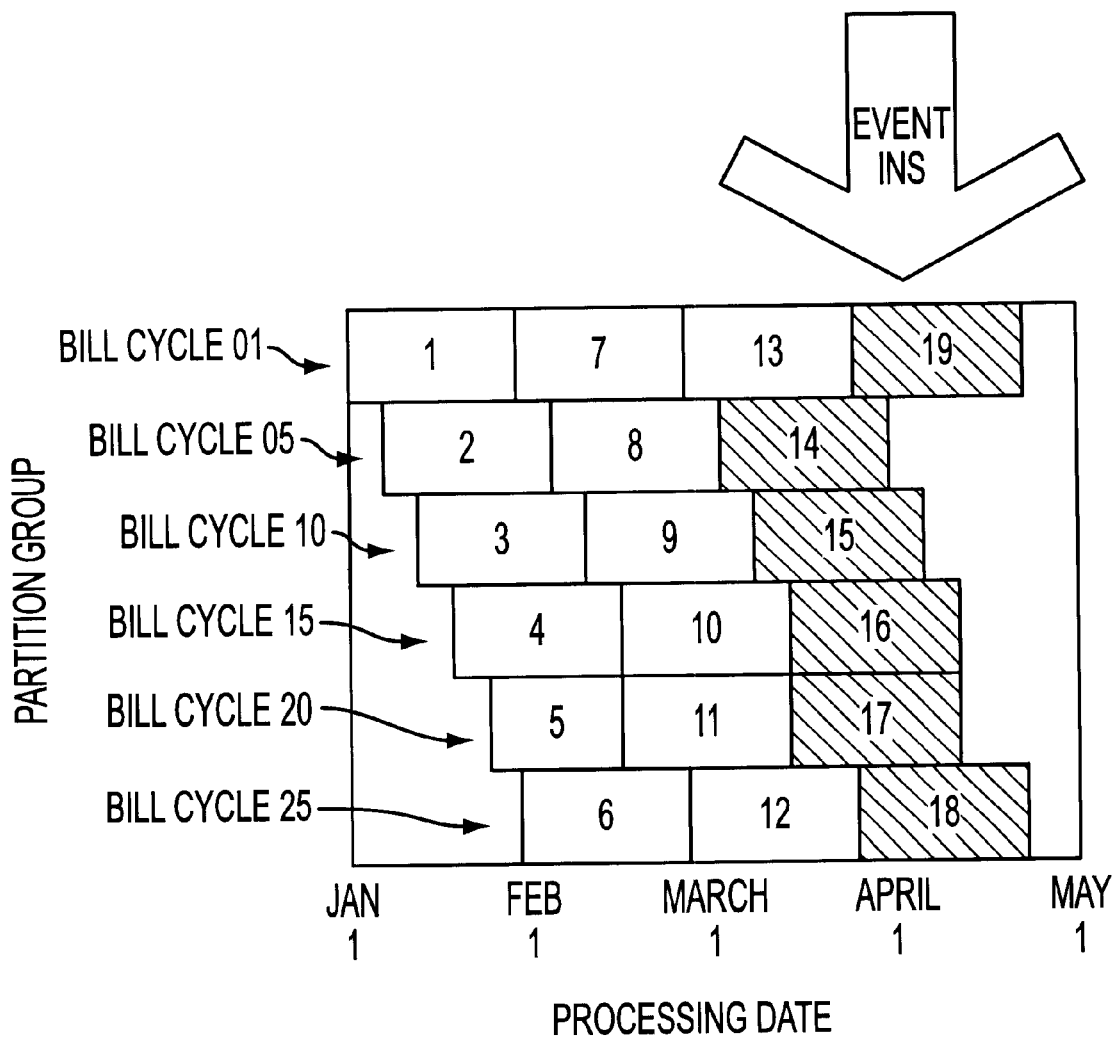
FIG. 5 is an example chart showing billing cycles and active partitions as shown in FIG. 4 but as of April 1 date.
Figure 6:
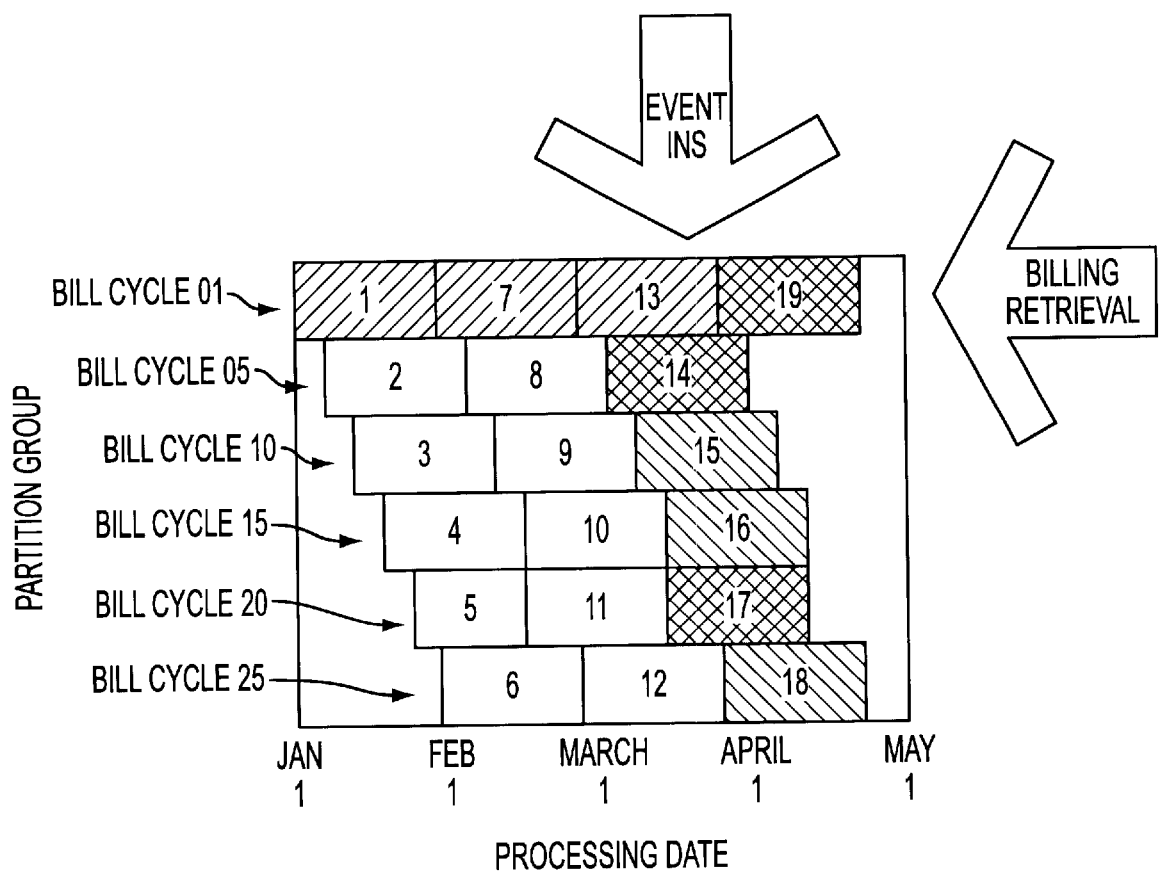
FIG. 6 is an example chart showing billing cycles and active partitions as shown in FIG. 5 but as of April 2 date.

[1] The Partition Number is in reference to specific partitions in FIGS. 4–6. Date of April 1 as shown in Table 2 above. On March 31 (before the Cycle Due Date), no Bill Cycle will be running and Events will be inserted into the highest date partitions (13 through 18) as shown in FIG. 4 and operation 430 in FIG. 9.

Figure 8:
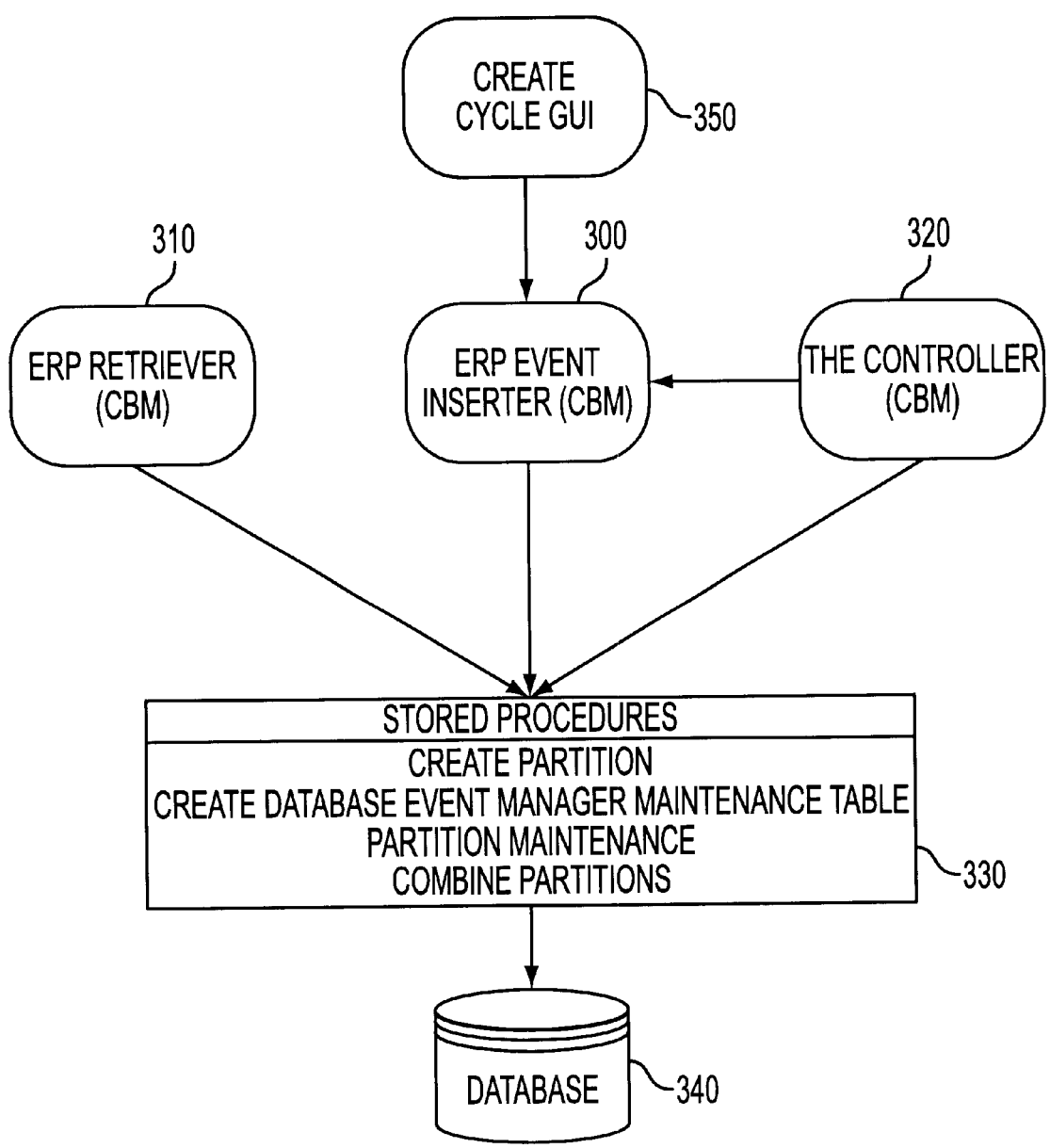
FIG. 8 is a diagram showing the modular configuration of an embodiment of the present invention used to accomplish the two-dimensional partitioning of data.
Figure 9:
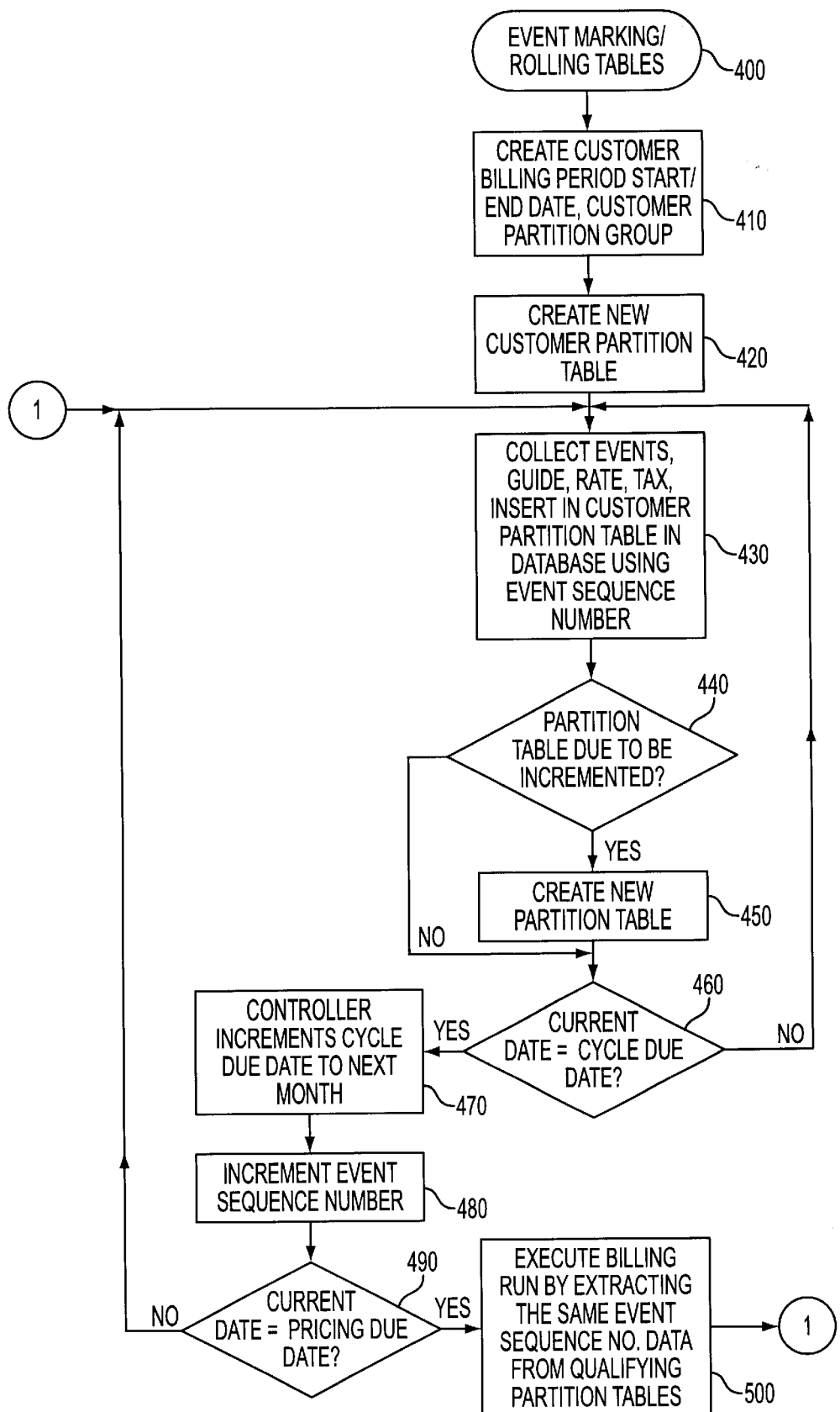
FIG. 9 is a flowchart showing the process and method used by an embodiment of the present invention to accomplish the two-dimensional partitioning of data.

In the discussion of the examples found in FIGS. 4–7 reference will be made to the FIGS. 8 and 9. FIG. 8 is a diagram showing the modular configuration of an embodiment of the present invention used to accomplish the two-dimensional partitioning of data. FIG. 9 is a flowchart showing the process and method used by an embodiment of the present invention to accomplish the two-dimensional partitioning of data.

ERP Event Inserter 300 shown in FIG. 8 is used for all Event specific maintenance. The ERP Event Inserter 300 invokes the stored procedure 330 that creates a new partition when a new Bill Cycle is created or an existing Cycle Due Date is increased. ERP Event Inserter 300 is also used for deletion when a parameter-driven number of days (e.g. 80 days) has passed since the Production Run is distributed and the partition is no longer needed online.

ERP Retriever 310 shown in FIG. 8 retrieves the Events which qualify for a Bill cycle.

Controller 320 shown in FIG. 8 finds a cycle that is due to begin. It initiates the production run and updates the Cycle Due Date.

Create Cycle GUI 350 shown in FIG. 8 is used for the creation of a new Cycle, e.g. for a new customer. This request is sent to the ERP Event Retriever.

Referring to FIG. 9, execution of the present invention begins in operation 400 with the acquisition of a new customer on March 1 from Table 2 above. In operation 410 of FIG. 9, the Create Cycle GUI 350 creates a new Cycle for a new customer and sends a message to the ERP event inserter 300, shown in FIG. 8, to set a customer billing period including billing period start and end dates as well as the creation of a customer partition group by calling stored procedure 330 ("create partition"). In this example the billing period start date is on March 1, end date March 31 (Partition Table Number 13 in Table 2). After this set up is complete, Events are captured in the Partition Table No. 13, as illustrated by 430 in FIG. 9. It should be noted that it is possible for collected Events to be inserted in more than one Partition Table in a billing period to keep Partition Tables of manageable size. In that situation the Partition Table is incremented by ERP prior to the Cycle Due date (440, 450). In the simple example from Table 2 the Partition Table is incremented monthly, in this case from Partition Table Number 13 to 19.

When the Current Cycle Due date is reached (460), the CBM Controller (320) increments the Cycle Due Date (470) to next month. (in our example from Table 2 it gets incremented from March 1–March 31 to April 1–April 30.

Referring to FIGS. 5 and 9, on April 1, the Bill Cycle comes due and the Controller sets the Cycle Due Date to the next month, May 1 in operation 470 of FIG. 9. At the same time as the update to the Cycle Due Date, the Controller 320 calls the ERP Event Inserter 300, which uses the stored procedure 330 ("Create Partition") shown in FIG. 8 to create a new partition for Partition Group 01 with the date May 1 in operation 420 of FIG. 9. In operation 430 of FIG. 9, Event insertion is done by ERP Event Inserter 300 for April 1 and will now go into the new partition created in operation 450 of FIG. 9, so event insertion will be placed into partitions 14 through 19 as shown in FIG. 5. The insertion is done by ERP Event Inserter 300 in FIG. 8.

Referring to FIG. 6, on April 2, the pricing due date is reached and the full billing run begins. The determination that the current date is the pricing due date is made in operation 490 in FIG. 9. At that point events are extracted from all partitions for Partition Group 01 for the Bill Period that corresponds to dates March 1 through April 1 in operation 500 shown in FIG. 9. The operation is performed by ERP Retriever 310 in FIG. 8. Qualifying retrievals are events with the same Event Sequence Number for a given Account ID. A bill cycle may contain several accounts, but each with its own sequence number. The qualifying retrievals may be found in the partitions which were created/ updated during the qualifying period (as shown in examples for March 1 through March 31. Retrieval speed will be increased because of partition elimination and this is accomplished by the ERP Retriever (CBM) 310 calling stored procedures 330. Partition elimination means that in the example shown in FIG. 6, only 4 partitions out of 19 will be read.

In operation 430 of FIG. 8, insertion will continue into partitions through 19 using the ERP Event Inserter 300. In addition, contention will be minimized since the only partition accessed by both insertion and retrieval is partition 19. If the creation of a new partition is coupled to the increase of sequence number in a given bill cycle, then contention can be eliminated completely.

FIGS. 4 through 6 represent a simplified view of the issues to be solved. They are only a variation of FIG. 1, where the time duration of each cycle and each Partition Table is constant. However, as illustrated in FIGS. 2 and 3, real situations are more complex, as bill cycles cannot be assumed to fall neatly on the partition "time" boundary of the Partition Table.

For example, from FIG. 3, Partition Group A, assuming the pricing due date is in the middle of Partition Table 3, item 220, and assuming there is a 2-day "lag" time between the Billing Period End Date and a Pricing Date (i.e., the Billing Period End date is on 4/15 and the Pricing Date is on 4/18). On 4/16 through 4/17 the system is still entering data into the same partition 220. Thus, using only the mechanism described above in FIGS. 4–6, ERP Event Inserter 300 shown in FIG. 8 would not be able to price only the events, which occurred prior to 3/16, as it would have no way to distinguish between the Events in the Billing Period ending 4/15 and those beyond, as all Events would be entered into the same Partition (item 220) Table 3. This is due to the fact that Events with the same sequence number can spill over several partitions. Hence, the mechanism described above is enhanced to take care of this situation, as discussed below.

The way to solve this problem is for the ERP Event inserter 300, shown in FIG. 8, to maintain an Event Sequence Number in each partition table as done in operation 430 of FIG. 9. This number is incremented when going from the n-th run of Bill Cycle X to the n-th+1 run of the same Bill Cycle as provided in operation 480 of FIG. 9. Each event is marked with a sequence number prior to its insertion in the database 340 (i.e. in the Partition Tables) by the ERP Event Inserter 300 shown in FIG. 8. Such a sequence number can also be thought of as a bill number. For example, assuming the same case as in the previous paragraph above, i.e. in FIG. 3 Partition Group A (items 200, 210 and 220) represents a set of new customers, whose Bill Cycle starts on 3/16 and finishes on 4/15. Further assuming that Partition Table 1, item 200, starts on 3/16, but Partition Table 3, item 220, finishes on 4/20 and the Pricing Due Date is on 4/18. The following sequence of events will occur.

1. All events for one given customer in Partition Group A Partition Table 1, 2 (items 200 and 210 in FIG. 3) are marked with Event Sequence 1 by ERP Event Inserter 300 shown in FIG. 8 in operation 430 of FIG. 9.
2. All events for the same given customer in Partition Group A, Partition Table 3 (item 220 in FIG. 3) are marked with Event Sequence number 1 up to and inclusive of 4/15 by ERP Event Inserter 300 shown in FIG. 8 in operation 430 of FIG. 9.
3. All events for the same given account in Partition Group A, Partition Table 3 (item 220 in FIG. 3) are marked with Event Sequence number 2 starting on 4/16 by ERP Event Inserter 300 shown in FIG. 8 in operation 480 of FIG. 9.
4. On 4/18 ERP Retriever 310 shown in FIG. 8 reads data from Partition Group A, Partition Tables 1, 2 and 3 (items 200, 210, 220 in FIG. 3), and bills only Events with Event Sequence Number "1" for that given account (and of course other accounts with other sequence numbers due in that same Partition Group A). This is done in operation 500 of FIG. 9 by the ERP retriever 310 shown in FIG. 8.

All the foregoing Event Sequence numbers are created just prior to the Events insertion in the Partition Tables (database 340 shown in FIG. 8) by ERP Event Inserter 300 shown in FIG. 8. In a second Bill Cycle a month later ERP will read data from Partition Tables 3, 4, 5 (not shown in any table), and bill Events marked with an Event Sequence Number "2". This will mean that only the events marked "2" in Partition Table 3 are included. In this example, this corresponds to events starting 4/16. Once pricing is done, the "old" event sequence number is the link between the account, the summary events and the single event belonging to one bill. The increment of the Event Sequence Number is done by the CBM Controller 320 shown in FIG. 8, and is based on date and time.

This Event marking combined with horizontal/vertical partitioning has several positive side-effects which are discussed in detail below.

Performance optimization is seen since the database is only written to once (traditional systems go back to the database at billing time and mark the events then, which puts an unnecessary load on the machine. It also complicates backups, as the tables need to be backed up for the second time now that the bill number has increased, which hits performance for the second time).

By keeping track on Event sequences the system knows which events have been billed and which are yet to be billed without physical modification of the database records.

By keeping track on Event sequences a given bill can be easily retrieved (through "read" database access) without an overhead of a complex selection algorithm. The incrementation of the sequence numbers is coordinated with bill production, i.e. ERP understands which sequence number goes to each bill instance.

Flexibility is increased since it is possible to change bill cycles easily to swiftly react to either business circumstances, or load balancing among different bill cycles, as creating partitions is independent of the bill cycle.

Different accounts can be on different bill cycles (e.g. Account ID 100 can be on bill cycle 2 while Account ID 200 can be on bill cycle 11).

As the system is bill cycle independent, system set up can be driven by production requirements. For example creation of partitions can be done daily, every two days etc., depending on the system administration needs. If production requirements change, e.g. instead of creating a new partition every two days these need to be created daily, the more frequent partition creation can be implemented without impacting rating and billing.

System administration (e.g. backup, restores) and ongoing operation requirements do not clash. For example, a system may be set up to create a new partition daily at a fixed time, e.g. at 2 am. When this time is reached, ERP continues rating and inserting new events into this new partition, while the "old" partition can be set "off-line" and backed up safely. All of these activities are independent of the bill cycle.

The extreme flexibility may be illustrated by supporting threshold billing, where a customer gets a bill when a certain threshold in dollar amount reached, rather than on a particular date. For example, a bill may be generated for a particular customer each time the bill reaches $10,000.00. With some very large customers this amount may be reached every few days. Thus, that customer would have many bills issued per month. So in this situation, there is no "bill cycle" at all. Thus, the concept of bill cycles is not required for the partitioning/sequence number concept to be employed.

Architecture

Figure 7:
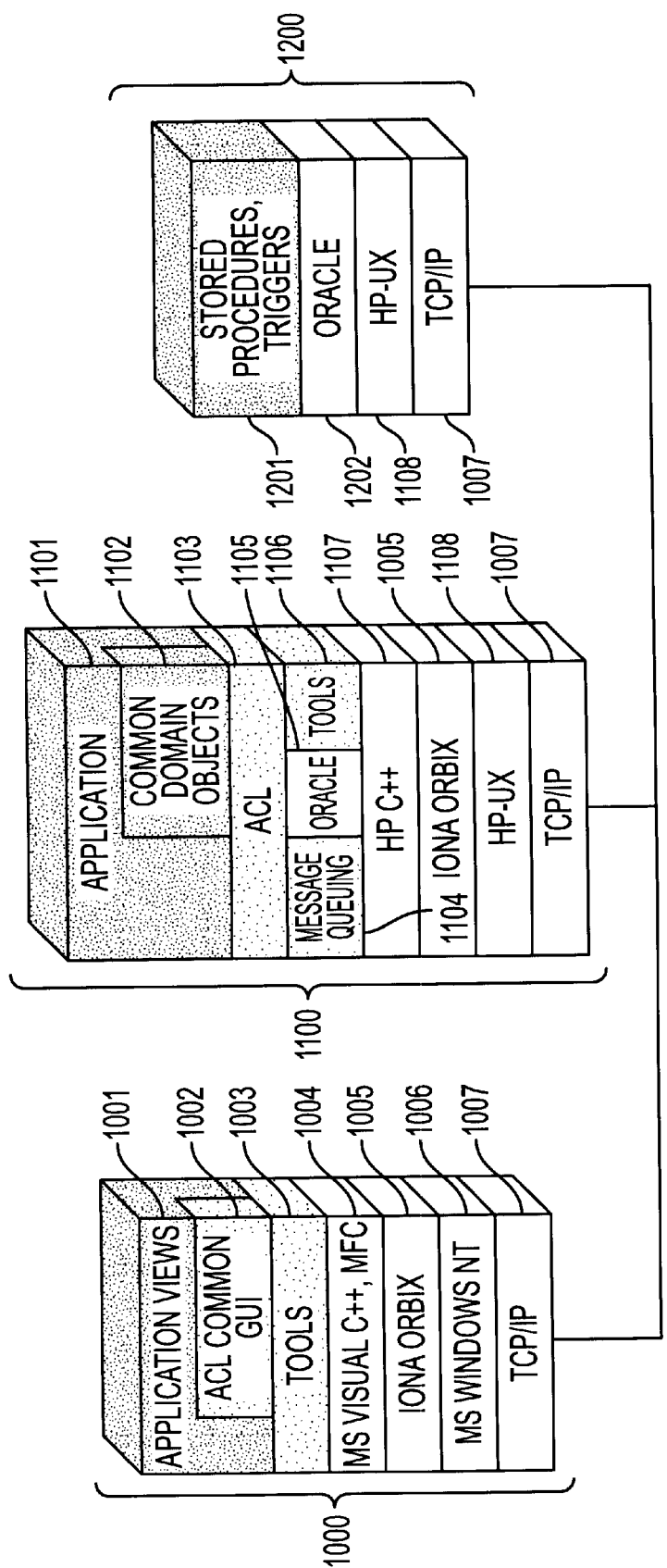
FIG. 7 is the physical architecture of an embodiment of the present invention.

FIG. 7 is an example of a 3-tier architecture, which supports this invention. Database partitioning is done on the database server 1200. Applications using such partitions run either solely on the application server 1100 (e.g. the batch applications ERP and CBM)), or on the application server 1100 as well as the PC client 1000. The example of the latter is the CSR responding to a customer query will use the Customer Care Manager (CCM) subsystem to retrieve data about the events (i.e. phone calls) from the database server 1200. Thus ,"Application" on the application server 1100 can be ERP, CBM or CCM. Application views 1001 on the PC client 1000 would relate to the CCM subsystem, used by the CSR.

The architecture shown in FIG. 7 is called a 3-tier architecture. The main advantage is that if the application server 1100 is overloaded, the customer can simply add additional application servers 1100 to the network without rewriting any application software. In the typical telecom environment millions of transactions per day are likely to occur. If the invention was used in a very small environment, it could use the PC Client system 1000 and one server, in which situation the "business logic" shown on the application server 1100 would run on the PC client system 1000. Such a configuration is called 2-tier architecture. The problem with a 2-tier architecture is that if the PC client server 1000 is overloaded, there is nothing that can be done to spread the load (other than to perhaps add more memory to the PC, or buy faster PCs, none of which may solve the problem). A 2-tier system would be extremely limited and would not be able to handle the possible load anticipated.

Referring to FIG. 7, the PC client system 1000, Application server 1100 and Database server 1200 use TCP/IP 1007 as the communication protocol to communicate amongst each other. The PC client system 1000 uses a Windows NT Operating System 1006. Application programs using Microsoft Visual C++ and Microsoft Foundation Classes (MFC) 1004 are run on the PC client system 1000.

All application logic resides on the application server 1100. Communications can be between the PC client system 1000 and the Application Server 1100, between the Application Server 1100 and the Database Server 1200. All communications to the Database Server 1200 goes through the Applications Server 1100.

Still referring to FIG. 7, both synchronous and asynchronous communications are supported. The communications protocols, methods etc. are provided by ACL 1103 ("AMS Class Libraries"). ACL 1103 represents a set of common functions used by all applications. Examples of functions provided are database access (read, write), communications access, and messaging.

Still referring to FIG. 7, all data resides on the database server 1200. As the invention described is an object oriented (OO) system, the translation between objects and the relational database on the database server 1200 is done through a persistence layer (not shown). This layer is responsible for "mapping" objects to database tables. The persistence layer is part of ACL (not shown). Note that a typical system is installed on either a Local Area Network (LAN) or Wide Area Network (WAN), supporting hundreds of clients and tens of application servers and database servers.

The following table 3 serves to define all items that appear in FIG. 7.

TABLE 3

| Layer | Description |
|---|---|
| ACL 1103 | AMS Class Library which provides infrastructure support for server-based processing. |
| ACL Common GUI 1002 | ACL classes that provide infrastructure support on a PC client. |
| Application 1101 | The CCB server-based application software. This layer includes the implementation of the business objects defined in the CCB object model designs. |
| Application View 1001 | That part of the CCB on-line application software that provides a user interface. |
| Common Domain Objects 1102 | These objects provide common classes that can be leveraged in different parts of the application to provide support for common services and functions. |
| HP C++ 1107 | C++ programming language. |
| HP-UX 1108 | UNIX for HP servers. |
| Iona Orbix ™ 1005 | CORBA 2.0 Object Request Broker (ORB) |
| Message Queuing 1106 | This provides guaranteed delivery for messages sent between processes. CCB |

TABLE 3-continued

| Layer | Description |
| --- | --- |
| | uses a custom approach for CCB 2.0. In a later CCB version, Arcor may wish to replace this by a third-party product like IBM's MQ Series. |
| MS Visual C++ ™, MFC 1004 | Microsoft C++ compiler and Microsoft Foundation Class libraries. |
| OracleTM 1202 | Oracle client and server software. |
| Stored Procedures 1202 | Application-specific Oracle stored procedures |
| TCP/IP 1007 | Network Communication protocol. |
| Tools 1003 | On servers, this includes third-party products. For ERP, Tools h++ in ACL are used. For creating bills in CBM, ISIS Papyrus is used. |

Alternate Embodiments

Although the current implementation runs under HP/UX operating system on the database server 1200 and the application server 1100, and under Windows NT on PC client 1000, the description of the invention is not limited to any specific technical implementation or software platform. It could run in n-tier environment or even on a mainframe. Similarly, although the database used is Oracle™ 1202, the invention described could be implemented on non-Oracle databases (e.g. with Sybase each rolled table could be a separately named table).

The invention is not limited to the terms and examples included in this description. The approaches described for the invention describe the preferred implementation according to the inventor, but the invention second dimension partitioning can be implemented in different ways.

Also, the invention is not limited to the telecommunications industry. The invention can be, applied to any other industry that requires a fast access to high volume of data at the database end, combined with the ability to do maintenance (backups, restores, etc).

The present invention has been described with respect to a system which reduces access, backup, and processing time required by partitioning data in a database by partition group and then further partition each partition group by event processing date into two-dimensional partitions in the form of rolling tables, plus the use of event sequence numbers.

As discussed above, although the present invention is implemented in a 3-tier client-server architecture, as would be appreciated by a person of ordinary skill in the art it could be implemented on any architecture including a mainframe.

All the examples discussed above relate to large business customers. However, the present invention also may be used for small business customers or residential customers as well. In the case of small business or residential customers the telecommunication company would group customers to partitions, rather than having each residential customer (or small business customer) having their own partition.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of two-dimensional database partitioning, comprising:

partitioning data received based on a first criteria;

partitioning the data partitioned based on a first criteria further according to a second criteria;

marking the data with an event marker, wherein the event marker represents an event sequence number, which is based on a date of billing for individual account; and storing the data in a two-dimensional partition.

2. A method of two-dimensional database partitioning as recited in claim 1, wherein the first criteria is event-processing date.

3. A method of two-dimensional database partitioning as recited in claim 2, wherein the second criteria is partition group.

4. A method of two-dimensional database partitioning, comprising:

partitioning data received based on a first criteria, wherein the first criteria is event-processing date;

partitioning the data partitioned based on a first criteria further according to a second criteria, wherein the second criteria is partition group;

marking the data with an event marker, wherein the event marker represents an event sequence number which is based on a date of billing for individual account; and storing the data in a two-dimensional partition, wherein once the data is stored it is not further modified in normal operations unless circumstances demand otherwise.

5. A method of two-dimensional database partitioning, comprising:

partitioning data received based on a first criteria, wherein the first criteria is event processing date;

partitioning the data partitioned based on a first criteria further according to a second criteria, wherein the second criteria is partition group;

marking the data with an event marker, wherein the event marker represents an event sequence number which is based on a date of billing for individual account; and storing the data in a two-dimensional partition, wherein once the data is stored it is not further modified in normal operations unless circumstances demand otherwise.

6. A method of two-dimensional database partitioning as recited in claim 5, wherein the date of billing for the individual account is based on a fixed billing cycle in which a particular customer account is billed on at the same time in a given time period.

7. A method of two-dimensional database partitioning as recited in claim 5, wherein the date of billing for the individual account is based on a threshold billing amount in which a particular customer account is billed when that customer account reaches a predetermined amount.

8. A method of two-dimensional database partitioning as recited in claim 5, wherein the date of billing for the individual account is based on a request received to generate the bill.

9. A method of two-dimensional database partitioning as recited in claim 5, further comprising:

extracting data for billing purposes based on the two-dimensional partition the data is stored in, the event marker and the Account ID.

10. A method of two-dimensional database partitioning as recited in claim 9, further comprising:

backing up data based on the two-dimensional partition the data is stored in.

11. A method of two-dimensional database partitioning as recited in claim 10, wherein data may be simultaneously entered into the two-dimensional partition while the backing up of data is occurring on two-dimensional partitions no longer accessed for storage of new data.

12. A method of two-dimensional database partitioning as recited in claim 10, further comprising:
   deleting data, by eliminating the two-dimensional partition, based on the two-dimensional partition the data is stored in and the sequence number.

13. A method of two-dimensional database partitioning as recited in claim 12, wherein the event marker can be used for filtering to either enable or disable application processing of data in the two-dimensional partition.

14. A method of two-dimensional database partitioning, comprising:
   creating a customer partition ID;
   creating a customer partition;
   collecting events, guide, rate, tax in the customer partition;
   inserting the collected events, guide, rate, tax in the customer partition using an event sequence number;
   determining whether to increment the customer partition table;
   creating a new customer partition table when the determination is made to increment the customer partition table;
   determining whether a current date is a cycle due date;
   incrementing the cycle due date to a next month when a current date is a cycle due date;
   incrementing the event sequence numbers for the Account IDs in that cycle;
   determining whether the current date is a pricing due date; and
   executing a billing run by extracting data having a given event sequence number from the customer partition tables.

15. A two-dimensional data structure embodied a computer readable medium for partitioning data in a manageable size comprising:
   said two-dimensional data structure being partitioned based on a first criteria and further partitioned according to a second criteria and being stored in one of a plurality of two dimensional partitions with an event marker in order to keep the size of the two-dimensional partition to a manageable size, wherein the event marker represents an event sequence number which is based on a date of billing for individual account, whereby processing time to access, backup and delete data is significantly reduced.

16. A two-dimensional data structure embodied a computer readable medium as recited in claim 15, wherein the first criteria is event processing date.

17. A two-dimensional data structure embodied a computer readable medium as recited in: claim 16, wherein the second criteria is partition group.

18. A two-dimensional data structure embodied a computer readable medium for partitioning data in a manageable size comprising:
   said two-dimensional data structure being partitioned based on a first criteria and further partitioned according to a second criteria and being stored in one of a plurality of two-dimensional partitions with an event marker in order to keep the size of the two-dimensional partition to a manageable size, wherein the first criteria is event processing date, the second criteria is partition group, and once the data in the two-dimensional data structure is stored it is not further modified in normal operations unless circumstances demand otherwise, whereby processing time to access, backup and delete data is significantly reduced.

19. A two-dimensional data structure embodied a computer readable medium for partitioning data in a manageable size comprising:
   said two-dimensional data structure being partitioned based on a first criteria and further partitioned according to a second criteria and being stored in one of a plurality of two-dimensional partitions with an event marker in order to keep the size of the two-dimensional partition to a manageable size, wherein the first criteria is event processing date, the second criteria is partition group, the event marker represents an event sequence number which is based on a date of billing for individual account, and once the data in the two-dimensional data structure is stored it is not further modified in normal operations unless circumstances demand otherwise, whereby processing time to access, backup and delete data is significantly reduced.

20. A two-dimensional data structure embodied a computer readable medium as recited in claim 19, wherein the date of billing for the individual account is based on a fixed billing cycle in which a particular customer account is billed on at the same time in a given time period.

21. A two-dimensional data structure embodied a computer readable medium as recited in claim 19, wherein the date of billing for the individual account is based on a threshold billing amount in which a particular customer account is billed when that customer account reaches a predetermined amount.

22. A two-dimensional data structure embodied a computer readable medium as recited in claim 19, wherein the date of billing for the individual account is based on a request received to generate the bill.

23. A two-dimensional data structure embodied a computer readable medium as recited in claim 19, further comprising:
   data is extracted from the two dimensional data structure for billing purposes based on the two-dimensional partition the data is stored in, the event marker and the Account ID.

24. A two-dimensional data structure embodied a computer readable medium as recited in claim 23, further comprising:
   the two-dimensional data structure is backed up data based on the two-dimensional partition the data is stored in.

25. A two-dimensional data structure embodied a computer readable medium as recited in claim 24, wherein data may be simultaneously entered into the two-dimensional partition while the backing up of two-dimensional partition is occurring on two-dimensional partitions no longer accessed to store new data.

26. A two-dimensional data structure embodied a computer readable medium as recited in claim 25, further comprising:
   deleting data in the two-dimensional data structure, by eliminating the two-dimensional partition, based on the two-dimensional partition the data is stored in and the sequence number.

27. A two-dimensional data structure embodied a computer readable medium as recited in claim 26, wherein the event marker can be used for filtering to either enable or disable application processing of data in the two-dimensional partition.

28. A two-dimensional data structure embodied a computer readable medium for partitioning data in a manageable size comprising:

said two-dimensional data structure being partitioned based on a partition group and further partitioned according to an event processing date and being stored in one of a plurality of two dimensional partitions with an event marker in order to keep the size of the two-dimensional partition to a manageable size, and used to extract billing information for a customer using the event marker together with the Account ID from the plurality of two-dimensional partitions, wherein the event marker represents an event sequence number which is based on a date of billing for individual account and wherein the data is stored, retrieved and deleted based on the event marker and the two-dimensional partition the data is stored in.

29. A two-dimensional database system to partition data into manageable partitions for rapid access, backup and deletion, comprising:

a database divided into a plurality of customer partition, wherein the plurality of customer partition groups are formed in two dimensions;

an ERP event inserter to insert customer data tagged with an event marker into a customer partition of the plurality of customer partitions;

an ERP retriever to retrieve customer data from the plurality of customer partitions; and a controller to control the formation of the plurality of customer partitions.

30. A two-dimensional database system as recited in claim 29, wherein the controller controls the formation of the plurality of customer partitions based on a first criteria and a second criteria.

31. A two-dimensional database system as recited in claim 30, wherein the first criteria is based on event processing date and the second criteria is based on partition groups.

32. A two-dimensional database system as recited in claim 31, wherein the ERP event inserter inserts customer data in the customer partitions when a customer transaction occurs.

33. A two-dimensional database system as recited in claim 32, wherein once the data is inserted in the customer partition by the ERP event inserter it is not further modified in normal operations unless circumstances demand otherwise.

34. A two-dimensional database system as recited in claim 33, wherein the ERP retriever retrieves customer data when a customer makes an inquiry or when a customer billing run is due.

35. A two-dimensional database system as recited in claim 34, wherein the event marker represents an event sequence number which is based on a date of billing for individual account.

36. A two-dimensional database system as recited in claim 35, wherein the date of billing for the individual account is based on a fixed billing cycle in which a particular customer account is billed on at the same time in a given time period.

37. A two-dimensional database system as recited in claim 35, wherein the date of billing for the individual account is based on a threshold billing amount in which a particular customer account is billed when that customer account reaches a predetermined amount.

38. A two-dimensional database system as recited in claim 35, wherein the date of billing for the individual account is based on a request received to generate the bill.

39. A two-dimensional database system as recited in claim 35, wherein the ERP retriever retrieves data for billing purposes based on the customer partition the data is stored in, the event marker and an Account ID.

40. A two-dimensional database system as recited in claim 39, wherein the controller backs up data based on the customer partition the data is stored in.

41. A two-dimensional database system as recited in claim 40, wherein data may be simultaneously entered by the ERP event insert into the customer partition while the backing up of data is occurring on two-dimensional partitions no longer accessed to store new data.

42. A two-dimensional database system as recited in claim 41, wherein the controller deletes data, by eliminating the customer partition, based on the customer partition the data is stored in and the sequence number.

43. A two-dimensional database system as recited in claim 42, wherein the event marker can be used for filtering to either enable or disable application processing of data in the customer partition.

44. A two-dimensional database system to partition data into manageable partitions for rapid access, backup and deletion, comprising:

a database divided into a plurality of customer partitions, wherein the customer partition groups have two dimensions based upon event processing date and partition group;

an ERP event inserter to insert customer data tagged with an event marker into a customer partition of the plurality of customer partition when a customer engages in a transaction;

an ERP retriever to retrieve customer data from the plurality of customer partitions when a customer inquirer occurs or when a customer bill must be generated or when the customer account reaches a predetermined amount; and a controller to control the creation of the plurality of customer partition tables.

* * * * *

UNITED STATES PATENT AND TRADEMARK OFFICE
CERTIFICATE OF CORRECTION

PATENT NO. : 6,401,098 B1
DATED : June 4, 2002
INVENTOR(S) : Alexander Moulin

It is certified that error appears in the above-identified patent and that said Letters Patent is hereby corrected as shown below:

Column 2,
Line 41, insert -- ' -- before "on";
Line 42, insert -- ' -- after "billing".

Column 7,
Line 15, insert -- ) -- after "30";
Line 42, insert -- ) -- after "31"; and
Line 49, insert -- 14 -- after "partitions".

Column 11,
Table 3-continued, change "OracleTM" to -- Oracle$^{TM}$ --.

Signed and Sealed this

Eighth Day of October, 2002

Attest:

JAMES E. ROGAN
*Attesting Officer*     *Director of the United States Patent and Trademark Office*